United States Patent [19]

Kanda

[11] Patent Number: 5,768,305
[45] Date of Patent: Jun. 16, 1998

[54] IDENTIFICATION OF START AND END POINTS OF TRANSMITTED DATA IN SPREAD SPECTRUM COMMUNICATION SYSTEMS

[75] Inventor: Tetsuo Kanda, Yokohama, Japan

[73] Assignee: Canon Kabushiki Kaisha, Tokyo, Japan

[21] Appl. No.: 563,792

[22] Filed: Nov. 28, 1995

[30] Foreign Application Priority Data

Nov. 29, 1994 [JP] Japan ................... 6-319139
Mar. 16, 1995 [JP] Japan ................... 7-057327
Sep. 13, 1995 [JP] Japan ................... 7-235330

[51] Int. Cl.⁶ ............... H04B 1/707; H04J 13/04; H04L 7/00
[52] U.S. Cl. ............... 375/206; 375/367; 375/369; 370/479
[58] Field of Search ............... 375/200, 206, 375/208, 209, 210, 367, 369, 370; 370/335, 342, 441, 479

[56] References Cited

U.S. PATENT DOCUMENTS 4,958,359  9/1990  Kato ................................. 375/1
5,260,969  11/1993  Kato et al. ....................... 375/1

*Primary Examiner*—Stephen Chin
*Assistant Examiner*—Jeffrey Giluck
*Attorney, Agent, or Firm*—Fitzpatrick, Cella, Harper & Scinto

[57] ABSTRACT

A spread spectrum communication apparatus receives a preamble signal or a postamble signal as a pilot signal, and applies a correlative demodulation by using a single spread signal to the pilot signal, and a correlative output obtained after the correlative demodulation is compared to a reference value. If the correlative output is equal to or greater than the reference value, then it is recognized as a preamble or postamble signal. In accordance with a trailing edge of the preamble signal or a leading edge of the postamble signal, a start point or an end point of information transmission can be recognized, respectively, in a lower level of a communication system without using a unique word in a data stream, thereby reducing overhead of an upper level protocol and improving data transmission efficiency.

22 Claims, 16 Drawing Sheets

FIG. 15

| OUTPUT FROM CORRELATOR Q7 Q6 Q5 Q4 Q3 Q2 Q1 Q0 | | DEMODULATED DATA | OUTPUT FROM OR | OUTPUT FROM NAND | JUDGMENT SIGNAL | STATE OF RECEPTION |
|---|---|---|---|---|---|---|
| 127 | 0 1 1 1 1 1 1 1 | 0 | Hi | Hi | Hi | RECEIVING INFORMATION SIGNAL |
| 126 | 0 1 1 1 1 1 1 0 | 0 | Hi | Hi | Hi | RECEIVING INFORMATION SIGNAL |
| 16 | 0 0 0 1 0 0 0 0 | 0 | Hi | Hi | Hi | RECEIVING INFORMATION SIGNAL |
| 15 | 0 0 0 0 1 1 1 1 | 0 | Low | Hi | Low | ✕ |
| 1 | 0 0 0 0 0 0 0 1 | 0 | Low | Hi | Low | ✕ |
| 0 | 0 0 0 0 0 0 0 0 | 0 | Low | Hi | Low | ✕ |
| -1 | 1 1 1 1 1 1 1 1 | 1 | Low | Hi | Low | ✕ |
| -16 | 1 1 1 1 0 0 0 0 | 1 | Low | Low | Low | ✕ |
| -17 | 1 1 1 0 1 1 1 1 | 1 | Hi | Hi | Hi | RECEIVING INFORMATION SIGNAL |
| -127 | 1 0 0 0 0 0 0 1 | 1 | Hi | Hi | Hi | RECEIVING INFORMATION SIGNAL |
| -128 | 1 0 0 0 0 0 0 0 | 1 | Hi | Hi | Hi | RECEIVING INFORMATION SIGNAL |

IDENTIFICATION OF START AND END POINTS OF TRANSMITTED DATA IN SPREAD SPECTRUM COMMUNICATION SYSTEMS

BACKGROUND OF THE INVENTION

The present invention relates to a spread spectrum communication apparatus.

In spread spectrum communication, a code division multiplex communication method in which a plurality of communication paths are secured in a single band by using a low correlative feature of spread code so as to increase information transmission speed is available. There is a patent application on a synchronous code division multiplex communication apparatus using phase shift modulation (U.S. patent application Ser. No. 233,244, filed on Aug. 26, 1994). Generally, in a spread spectrum communication system having a single channel, a receiver has a spread code which is identical to the one used for spectrum-spreading a transmission signal, and by performing a correlative operation periodically between the spread code and a received signal, information transmission is performed while the spread code and the received signal are synchronized.

Further, in the aforesaid code division multiplex communication system, since an information signal is multiplexed by a plurality of spread codes, once the information signal is synchronized with the spread codes, because spread codes have low correlation or orthogonal relationship between each other at a synchronization point, it is possible to demodulate each information symbol individually. However, the periodic correlative feature between the plurality of spread codes does not always have low correlation. Therefore, when a periodic correlative operation is performed in some systems by using one of the spread codes, it is difficult to observe a sharp correlative peak in an output from a correlator, because correlative features of channels affect each other. As a result, it is also difficult to always synchronize a received signal with the spread code and maintain the synchronous state during transmission of information. Accordingly, in the code division multiplex communication system, in order for the receiver to synchronize a signal to be received with a spread code, the transmitter transmits a pilot signal, spectrum-spreaded by using a single spread code, as a preamble for a predetermined period before transmitting the information signal. After the receiver synchronizes the pilot signal with the spread code, the receiver synchronizes a received signal with the code and maintains its synchronous state during the information transmission period by holding a clock, for example.

FIG. 11 is a block diagram illustrating a configuration of a demodulator of the aforesaid conventional code division multiplex communication apparatus. In this example, it is assumed that a modulating method is phase shift keying and a demodulating method is coherent detection. In FIG. 11, a received signal 201 which is converted into an intermediate frequency signal is multiplied by a carrier wave 202 which is recovered by a carrier wave recovery circuit 101 in mixer 102. Then, the multiplied signal passes through a low pass filter (LPF) 103 and becomes a baseband signal 203. Further, the baseband signal 203 is converted into digital multiplexed signals by an A/D converter 104. A demodulator of a receiver has digital correlators 106 as many as the number of the multiplexed signals, and the multiplexed digital signals are correlative-demodulated by using a plurality of spread codes 205 generated by a code generator 105 in accordance with a recovery clock 204 recovered by a code synchronization circuit 108, thereby obtaining multiplexed information data of each channel. At this time, if the received multiplexed data to be applied with a correlative operation is represented by 8-bit binary notation with plus or minus sign and two-phase shift keying is applied, an output from the correlator is between −128 to +127, and the sign bit of the output can be considered as demodulated data. Low speed parallel data 206 which is thus demodulated is ultimately changed to a stream of high speed serial data 207 by a parallel-serial converter 107.

In order to recognize a changing point from a preamble period to reception of an information signal in a data stream in a packet mode data transmission, it is necessary to perform a method which relies upon a high level protocol in which a unique word having a predetermined bit pattern is inserted in the data stream so that an appearance of the unique word indicates the start timing point of the information signal to a receiver, for example. Further, conventionally, for recognizing when reception of the information signal is completed, or when the information signal of the data stream is invalidated, the packet length is mentioned in the header of the packet, or a unique word having a specific pattern is inserted as a delimiter at the end of the data stream, thereby notifying the completion of the transmission of the information signal.

However, a method of recognizing a data start point or a data end point at a high level of a communication system by inserting a unique word in a data stream, as described above, decreases data transmission efficiency. The decrease in transmission efficiency is especially remarkable when data is transmitted in a packet.

SUMMARY OF THE INVENTION

The present invention has been made in consideration of the above situation, and has as its object to provide a spread spectrum communication apparatus of high data transmission efficiency by recognizing a start point and/or an end point of information signal transmission in a low level of a communication system without inserting a unique word into a data stream, and by reducing overhead of higher level protocol.

Another object of the present invention is to obtain the same or similar effect as above, even if transmission performance of a communication path is poor.

According to the present invention, the foregoing object is attained by providing a spread spectrum communication apparatus comprising:

correlative demodulation means for performing correlative demodulation on a received pilot signal by using a single spread code;

comparing means for comparing a correlative output from the correlative demodulation means to a reference value; and recognition means for recognizing either a start point or an end point of information transmission on the basis of a comparison result by said comparing means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodi

FIG. 15 is a table used to determine reception of transmission according to embodiments.

DETAILED DESCRIPTION OF THE PREFERRED EMBODIMENTS

Preferred embodiments of the present invention will be described in detail in accordance with the accompanying drawings.

<First Embodiment>

Figure 1:
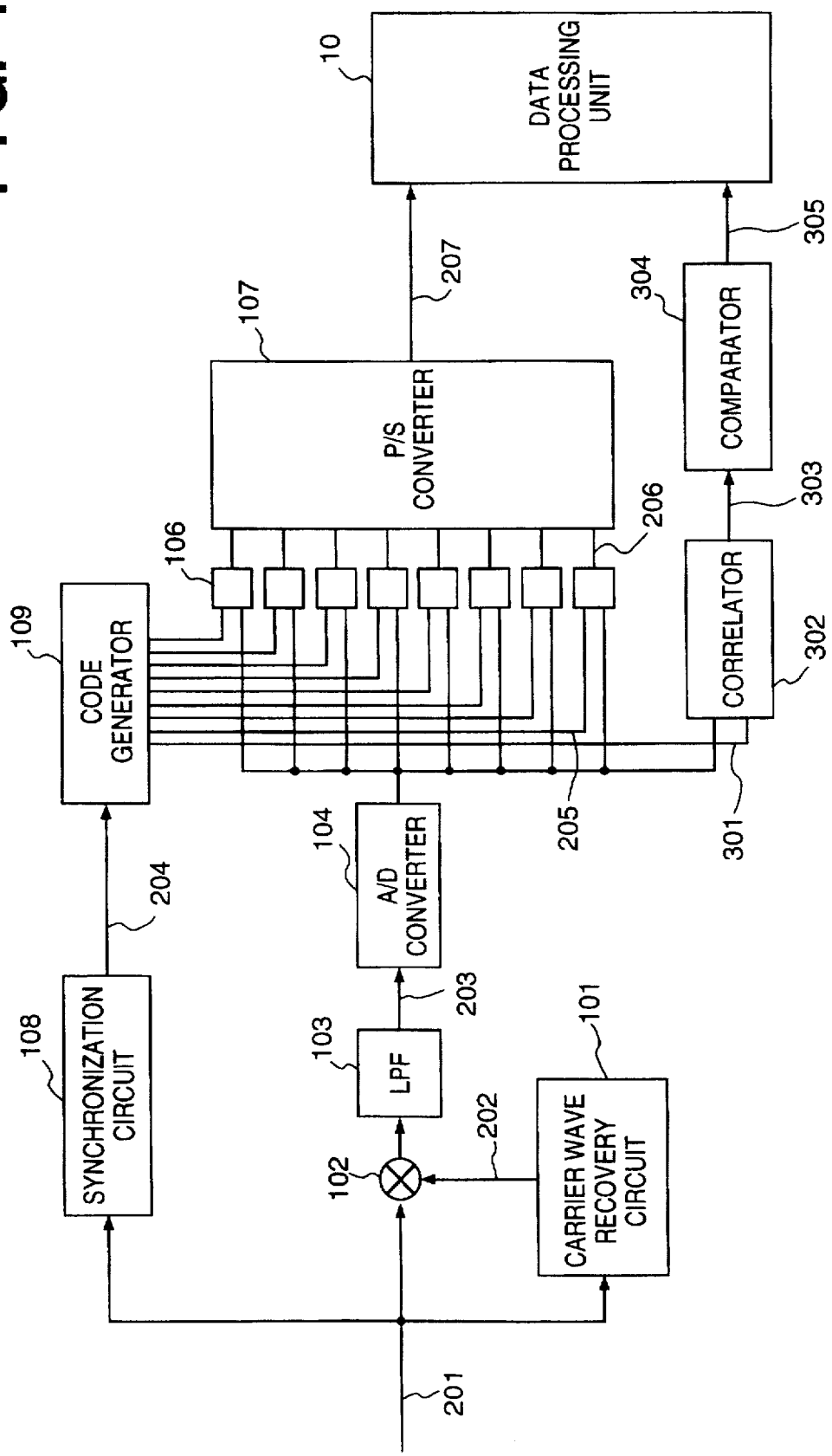
- FIG. 1 is a block diagram illustrating a configuration of a receiver according to a first embodiment.
Figure 11:
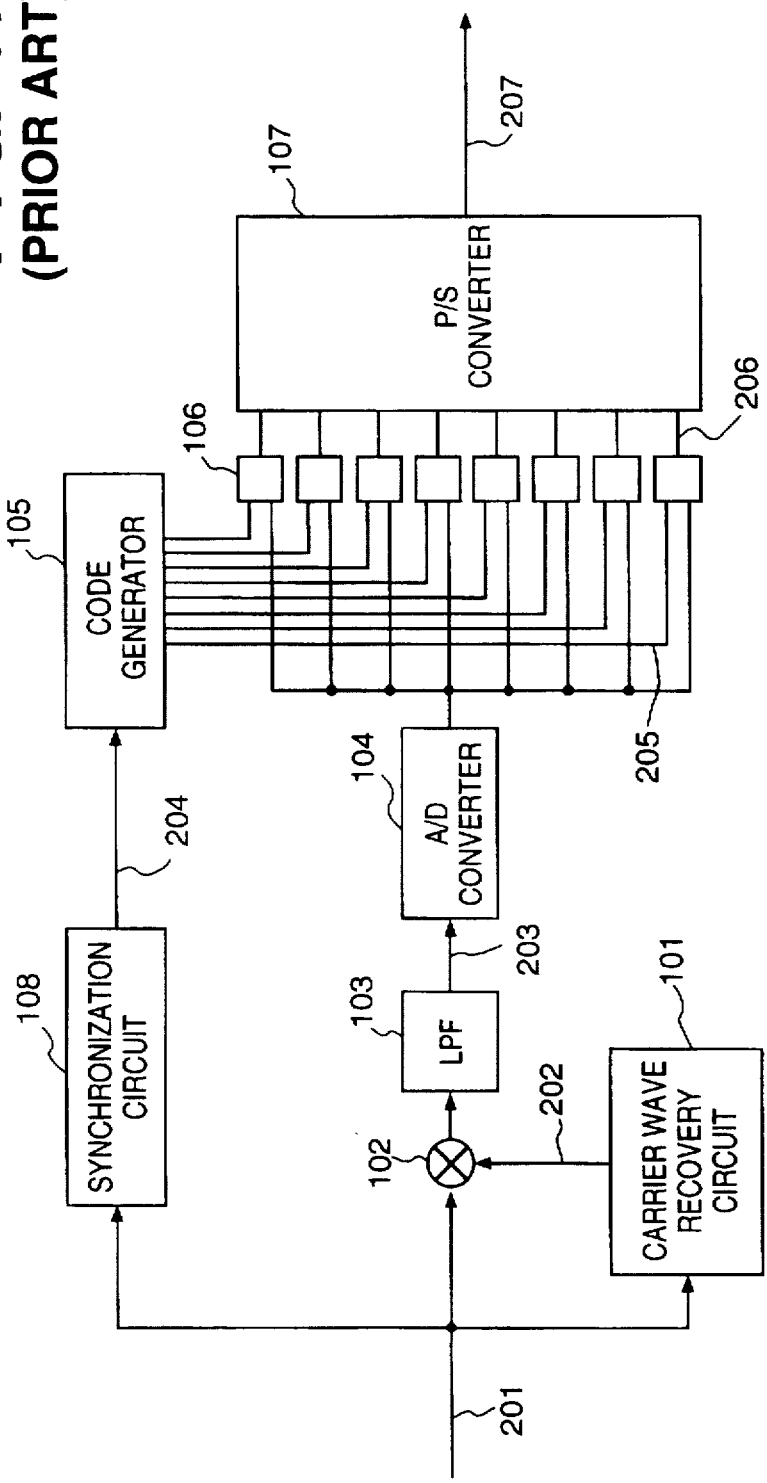
FIG. 11 is a block diagram illustrating a configuration of a receiver of a conventional code division multiple communication system.

FIG. 1 is a block diagram illustrating a configuration of a receiver according to a first embodiment of the present invention. The same units and elements as those in FIG. 11 are referred by the same reference numerals and explanations of those units and elements are omitted. In FIG. 1, a code generator 109 outputs the spread code 205 used for correlative demodulation of each information channel as well as a pilot code 301. A correlator 302 for a pilot signal (referred as "pilot signal correlator", hereinafter) performs correlative demodulation on a received signal with respect to the pilot signal 301. Note that, when the data processing unit 10 processes the received data in a parallel form, the parallel-serial converter 107 is not necessary.

If it is assumed that noise is small enough to be ignored, then, when there is no received signal, an output 303 from the correlator 302 is 0. Then, if a transmitter transmits a pilot signal as a preamble signal, after an input signal is synchronized with a spread code and carrier wave is recovered, a received signal power which is obtained by performing correlative demodulation on a pilot signal as a preamble signal appears as an output 303 from a correlator 302 of a receiver. The timing between a received signal and the output 303 from the correlator 302 is as shown in a timing chart in FIG. 2.

Further, when the preamble period has elapsed and information transmission starts, the pilot signal transmission is terminated. Therefore, an effect of the spread code, included in the received signal, of other information channel on a pilot code appears as the output 303 from the correlator 302. The correlation value in the code division multiplex communication system, however, is smaller than the value of a signal which appears during the preamble period, as shown in FIG. 2.

Figure 2:
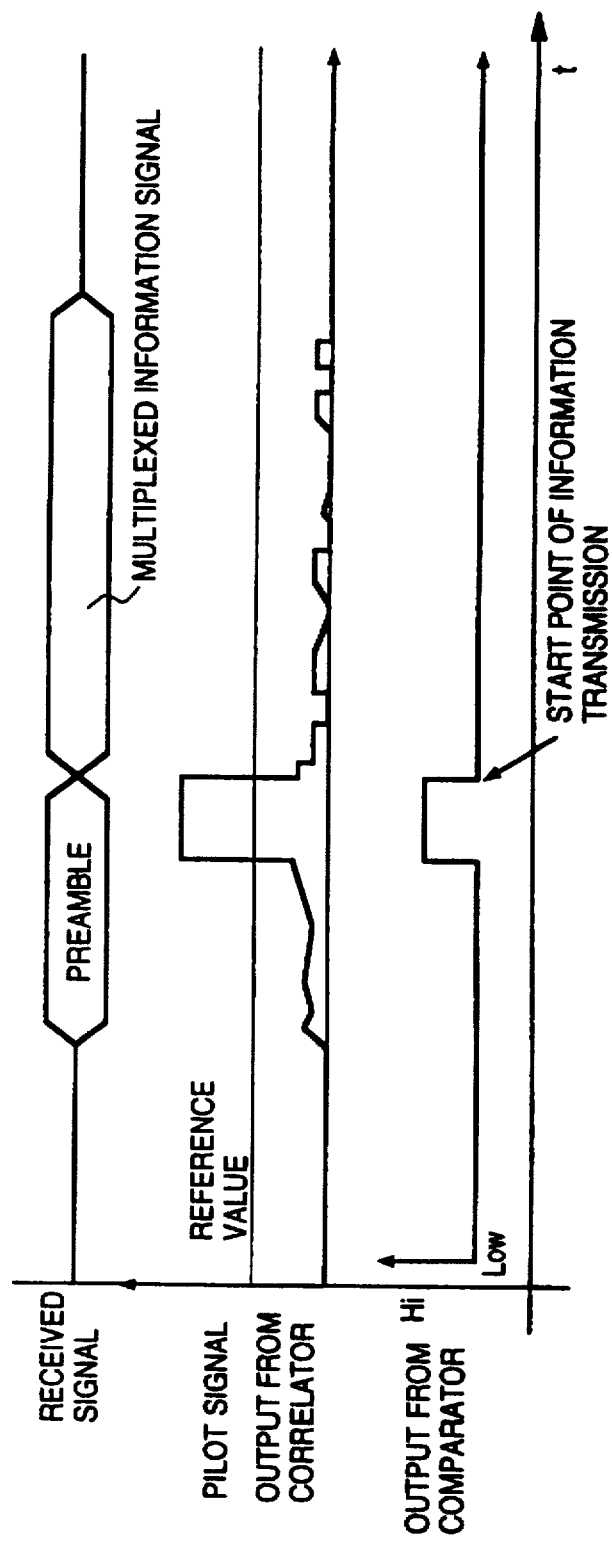
FIG. 2 is a timing chart according to the first embodiment.

With a comparator 304 for comparing the correlation value to a reference value which is shown in FIG. 2, an output 305 from the comparator 304 becomes a high level only during the preamble period as shown in FIG. 2. Thus, a data processing unit 10 recognizes the trailing edge as a changing point from the preamble period to an information transmission period, and processes the subsequent serial data stream 207. The comparator 304 will be described later in detail.

Figure 3:
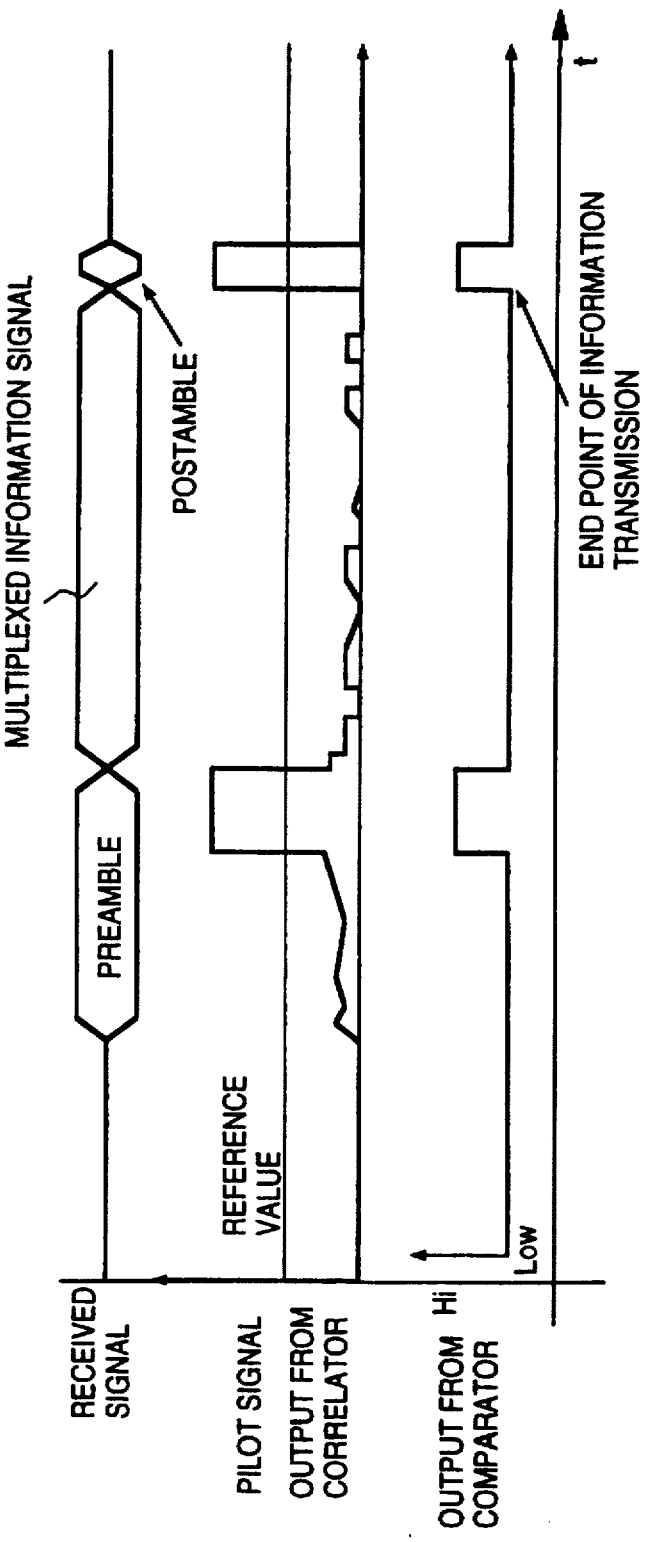
FIG. 3 is a timing chart according to a modified embodiment of the first embodiment.

Just after the information has been transmitted, the transmitter transmits a pilot signal as a postamble signal as shown in FIG. 3, then the output 303 from the correlator 302 of the receiver which received the pilot signal becomes large value as in the preamble period, and the output 305 from the comparator 304 becomes high level. Accordingly, it is possible to recognize a leading edge as the end of the information signal.

According to the first embodiment as described above, in packet mode code division multiplex communication, since start and end timing of the information signal transmission can be judged at a lower level of a communication system, an addition of packet header and a delimiter in the data stream become unnecessary, thereby improving information transmission efficiency.

In the first embodiment, the pilot signal is used only during preamble and postamble periods and is not used during multiple information transmission, however, the present invention is not limited to this, and the present invention can be applied to a case where a pilot code is used as a spread code of one of multiple information channels, for example.

Further, during multiplexed information transmission, there is a case in which a pilot signal having a lower electric power than that of the preamble signal is superposed on multiplexed data which is being transmitted, and is continually sent in order to recover a carrier wave. In this case, the pilot signal is generally not modulated by information data.

<Another Embodiment>

Figure 4:
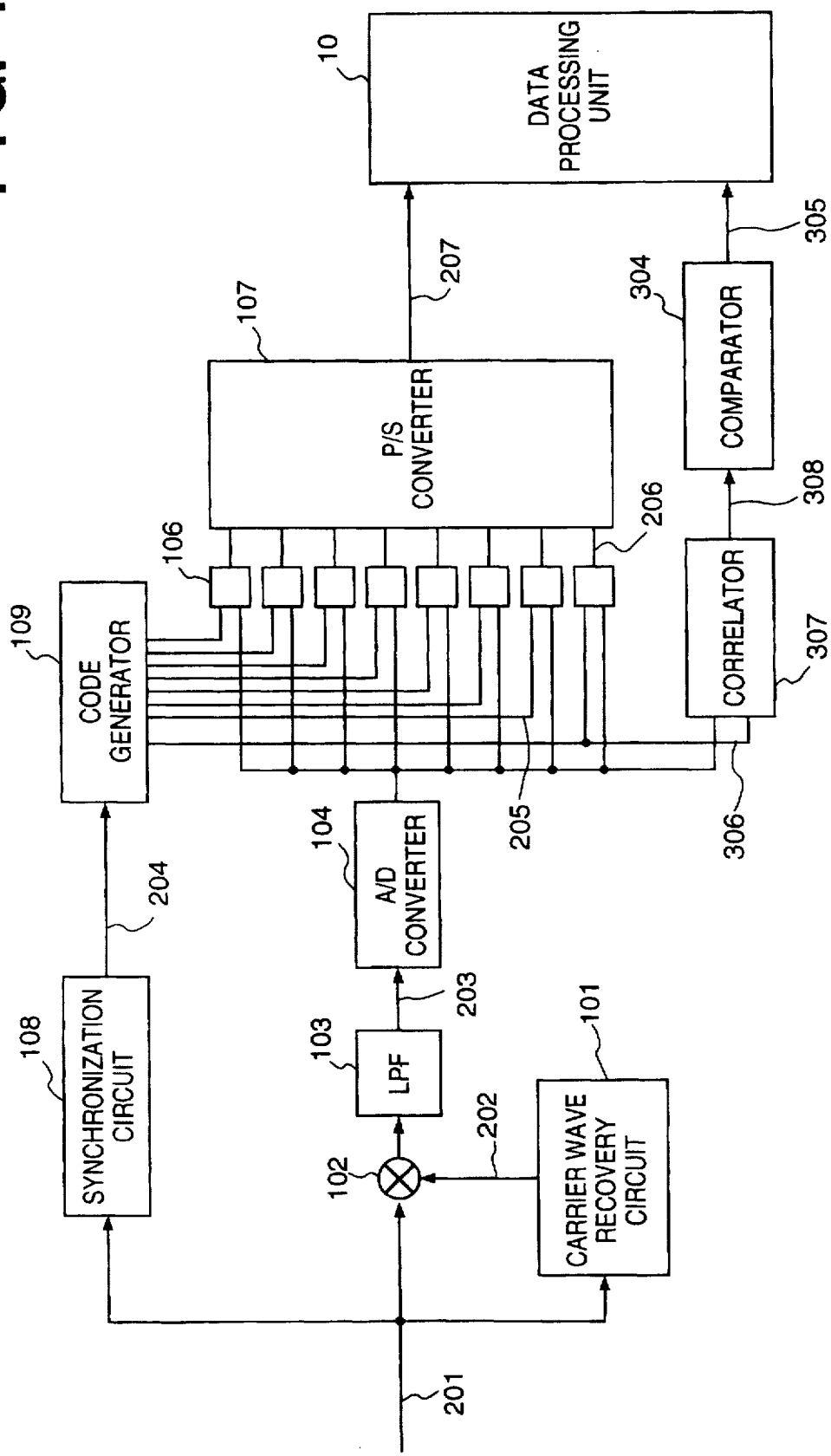
FIG. 4 is a block diagram illustrating a configuration of a receiver according to another embodiment.
Figure 5:
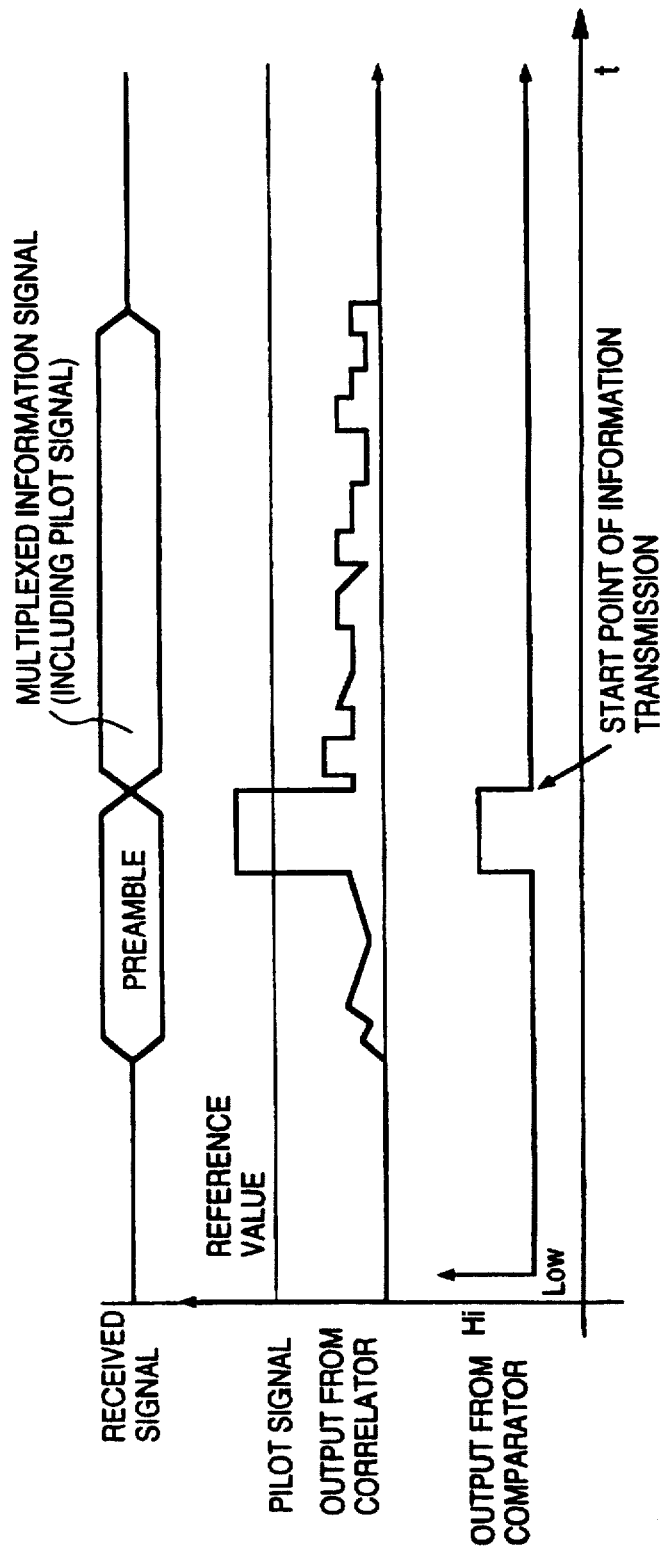
FIG. 5 is a timing chart according to another embodiment.
Figure 6:
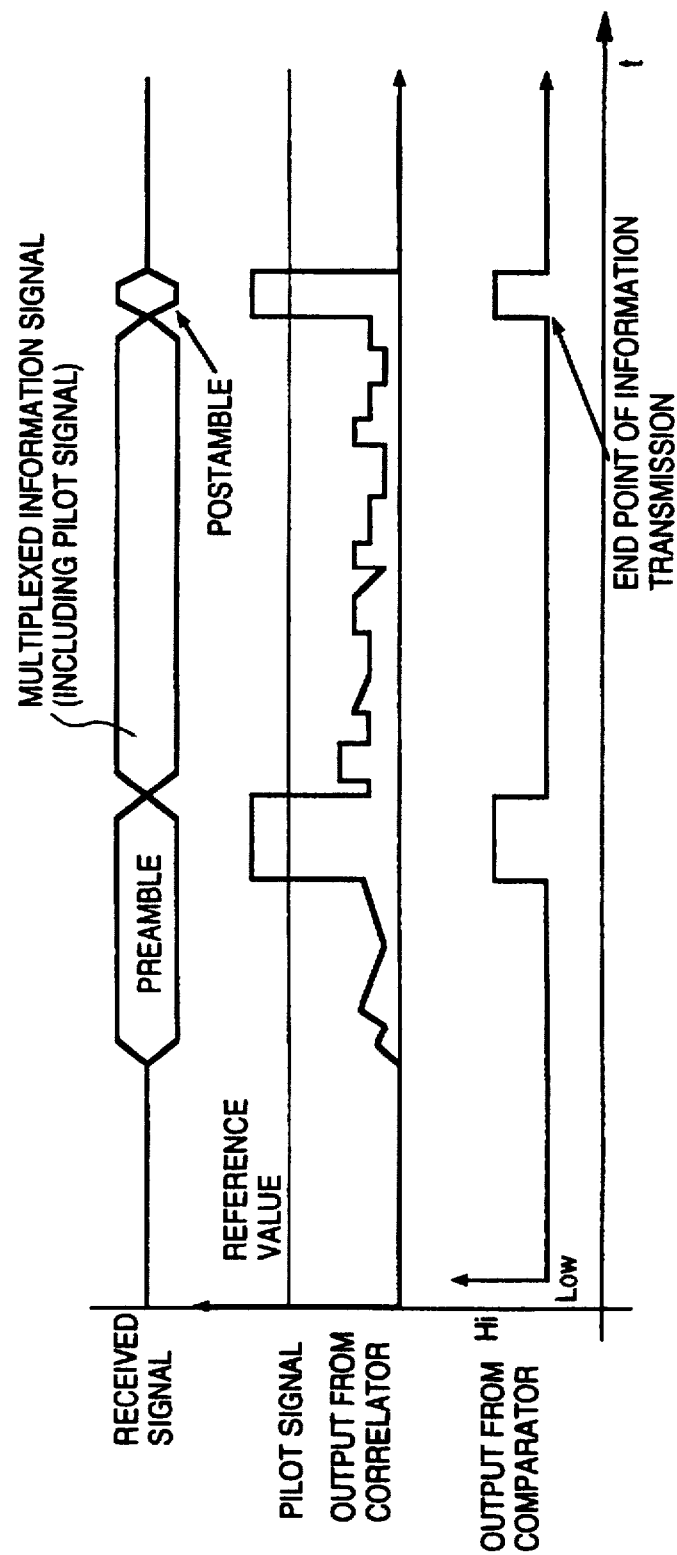
FIG. 6 is a timing chart according to a modified embodiment of another embodiment.

FIG. 4 is a block diagram illustrating a configuration of a receiver according to another embodiment of the present invention. The same units and elements as those in FIG. 1 are referred by the same reference numerals, and explanations of those units and elements are omitted. In FIG. 4, among spread codes, used for correlative demodulation, which are generated by the code generator 109, one of spread codes 306 is a pilot signal as a preamble or postamble signal, and the code 306 is inputted into both the correlator 106 and a pilot signal correlator 307. Focusing on an output 308, corresponding to a received signal by a receiver, from the pilot signal correlator 307, a timing chart which is shown in FIG. 5 or 6 is obtained. A noteworthy point here is that the pilot signal correlator 307 does not demodulate information symbols of the pilot channel. Rather, the pilot signal correlator 307 measures received signal power of a pilot channel by taking an absolute value of the correlation value. Therefore, the correlator 307 has functions different from those of the correlator 106 for demodulating information symbols.

In this embodiment, total transmission signal power during transmission of a preamble or postamble signal is designed to be about equal to total transmission signal power during information transmission period. More specifically, the pilot signal 306 is included both in the preamble and postamble signals and also in multiplexed information signal. However the pilot signal in the preamble and postamble signals has signal power which equals the total transmitted electric power. In contrast, since transmitted electric power is divided into each information channel, the power of the pilot signal during this period is smaller than the power of the signal during the preamble or postamble period Therefore, during a period of receiving a multiplexed information signal including a pilot signal, an output 308 from the pilot signal correlator 307 has a smaller value than a preamble or postamble signal as shown in FIG. 5 or 6. Thus, by comparing the output 308 from the correlator 307 to a predetermined reference level, it is possible to recognize a start point of the information signal transmission from a trailing edge, and an end point of the information signal transmission from a leading edge.

Figure 12:
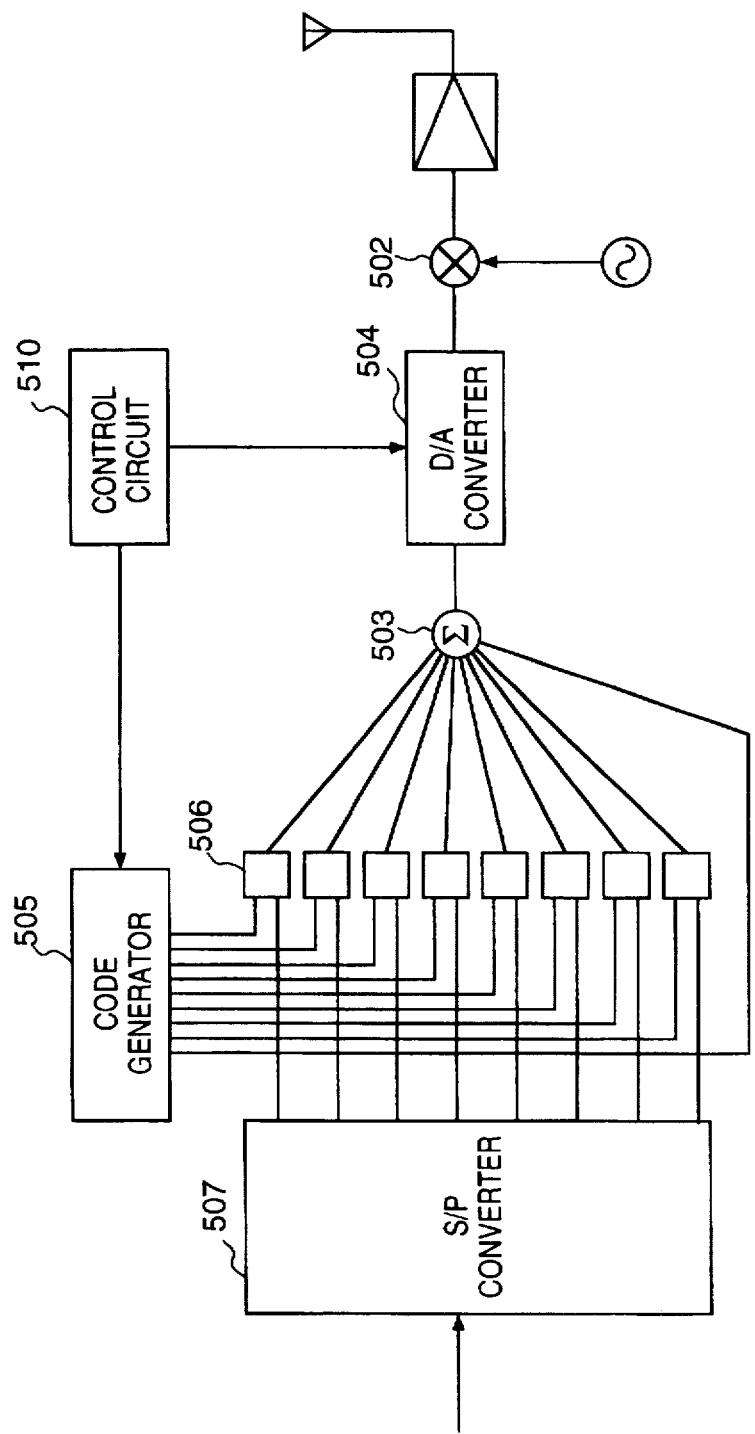
FIG. 12 a block diagram illustrating a configuration of a transmitter according to embodiments.

FIG. 12 shows a configuration of a transmitter. Transmitted serial data is converted into low speed parallel data by a serial parallel converter 507, and spread by a digital multiplier 506 by using a plurality of spread codes generated by a code generator 505, then added by a digital adder 503. Thereafter, the added data is converted into an analog signal by a digital analog converter 504, further modulated into a radio frequency signal by a modulator 502, then transmitted from an antenna.

A control circuit 510 shifts an output from the adder 503 by one or more bit before the output is converted into an analog signal so that total transmission electric power during the preamble period and total transmission electric power during information transmission become about the same. For example, if the output is shifted by three bits, then the total electric power becomes 8 times higher.

When a correlative demodulation is performed by a spread spectrum communication system, a correct demodulated output can not be obtained as an output from a correlator until a received signal and a spread code are synchronized. It is possible to obtain the desired information transmission start signal in a period when the output 303 from the correlator 302 is unstable with a configuration of the receiver shown in FIG. 1 under condition in which a correlation value is always smaller than a threshold in the comparator. However, if the output from the correlator becomes larger than the threshold, a compared output must be masked in accordance with a state signal indicating an input signal is synchronized with a spread code so as to control the information transmission start signal correctly.

<Second Embodiment>

Figure 7:
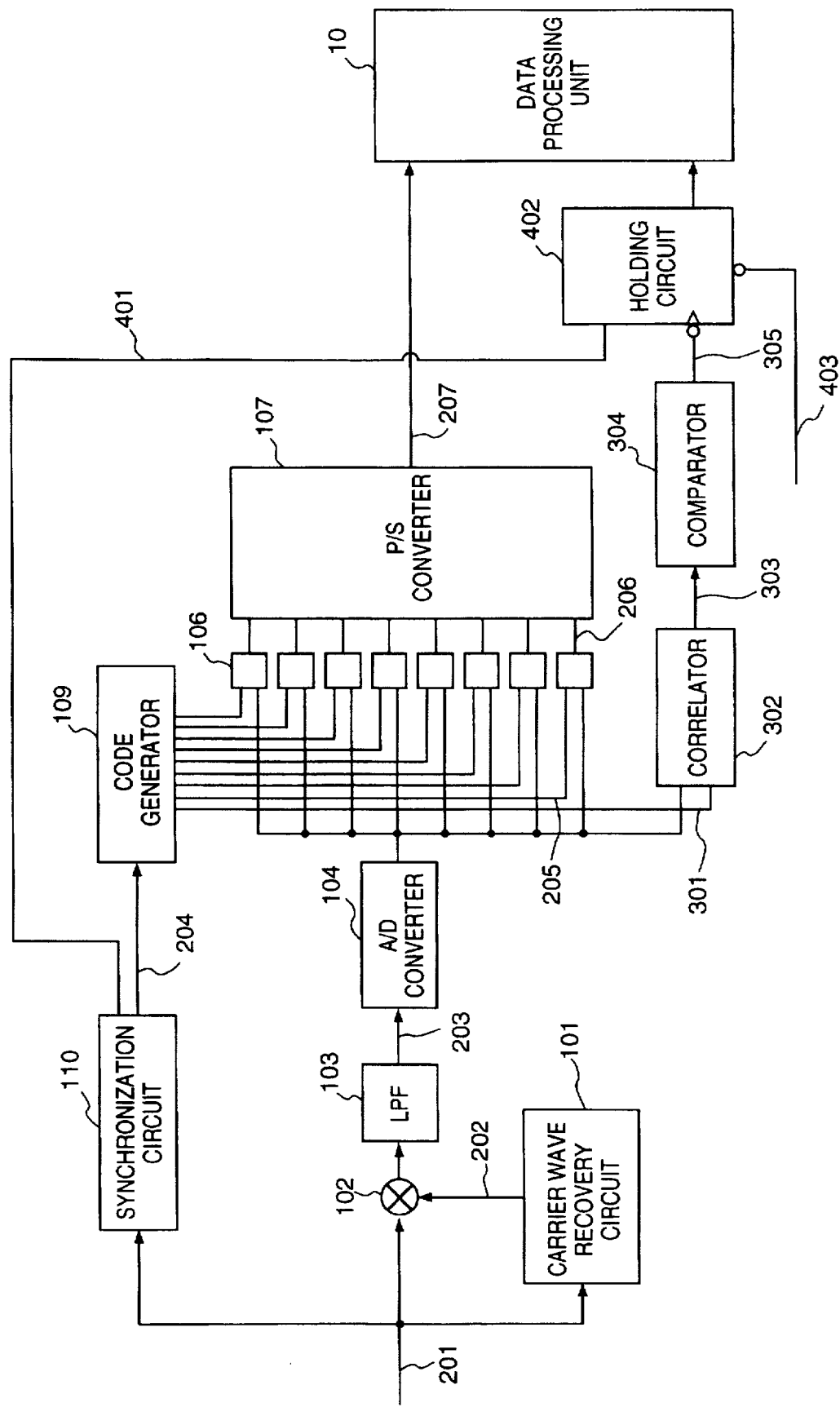
FIG. 7 is a block diagram illustrating a configuration of a receiver according to a second embodiment.
Figure 8:
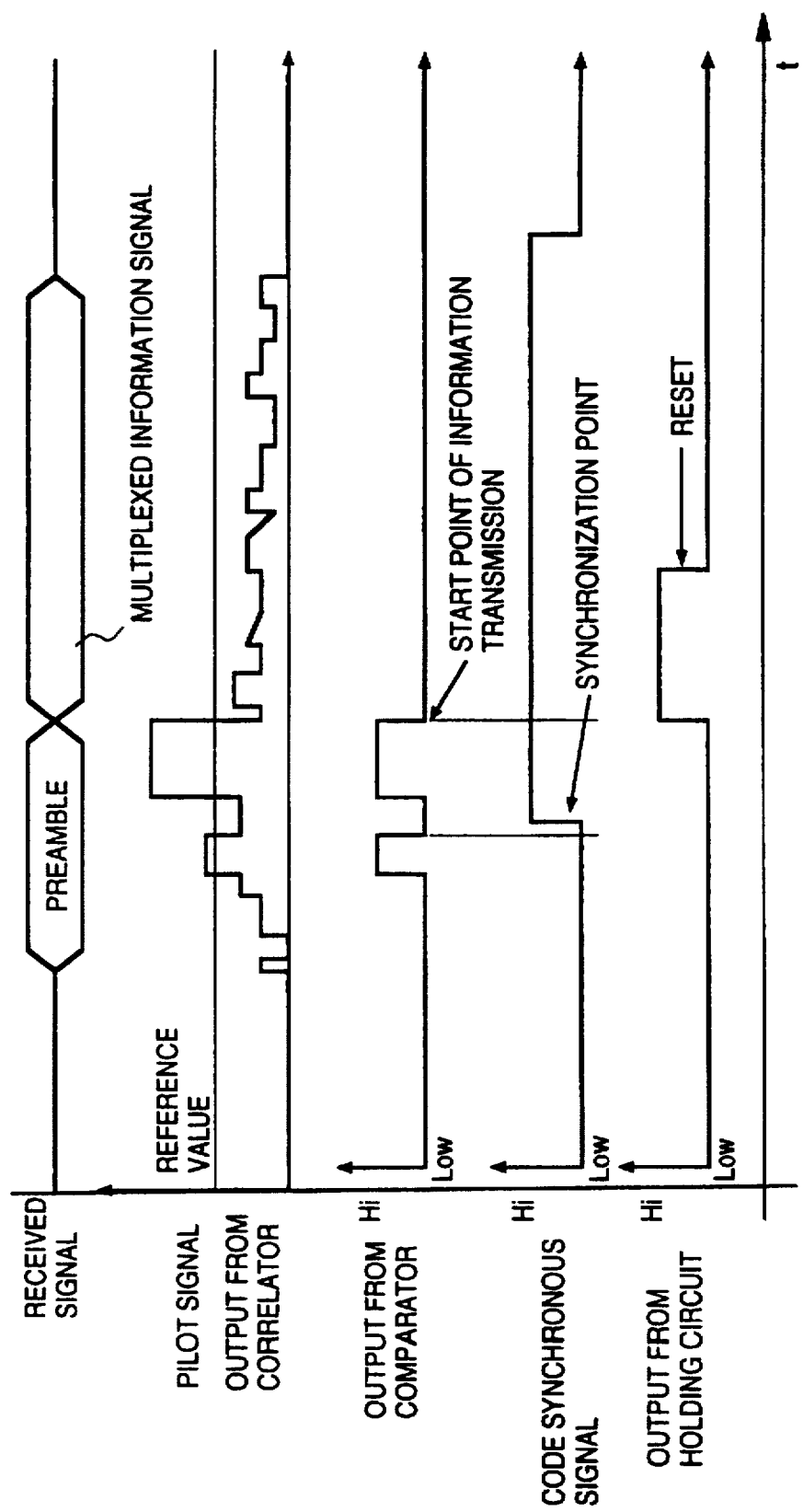
FIG. 8 is a timing chart according to the second embodiment.

FIG. 7 is a block diagram illustrating a configuration of a receiver according to a second embodiment. The same units and elements as those in FIG. 1 are referred by the same reference numerals and explanations of those are omitted. In FIG. 7, reference numeral 110 denotes a code synchronization circuit having a function for generating a code synchronization signal 401 for indicating that an input signal and a spread code are synchronized, when the input signal and the spread code are synchronized. In a case where a signal having a value which is over a reference value in the comparator 304 appears as the output 303 from a pilot signal correlator in a period before the input signal and the spread code are synchronized, an output 305 from the comparator 304 as shown in FIG. 8 appears. If it is assumed that an initial value of a holding circuit 402 is low level, since the holding circuit 402 which is connected next to the comparator 304 latches the code synchronization signal of low level, the state of the holding circuit 402 does not change, even though the output from the comparator 304 is unstable.

Thereafter, when an input signal and a spread code are synchronized, a code synchronization signal becomes high level, and the output 303 from the correlator 302 starts performing correct correlative demodulation of a preamble signal at the same time. Since correlation output in the subsequent period is larger than a threshold, the output 305 from the comparator 304 becomes stable in high level. Accordingly, after information transmission starts, then, a trailing edge is formed in the output 305 from the comparator 304. By latching the code synchronization signal which is high level by using the holding circuit 402 at the trailing edge, then a start point of information transmission can be recognized.

A purpose of the present embodiment is that the communication system recognizes a start point of information transmission. By resetting the holding circuit 402 in accordance with a signal 403 from a timer or an external device and making the holding circuit 402 in the initial state after the trailing edge appears, the same operation is performed on the next packet. Further, regarding a system using a pilot signal as a spread code for the information transmission, another embodiment expressed with reference to FIG. 4 can be applied.

In a code division multiple communication system which performs coherent detection, it is necessary that a received signal and a spread code are synchronized and that a carrier wave are recovered so as to demodulate a information signal. Depending upon a configuration of a receiver, there is a case that the carrier wave is recovered after an received signal and a spread code are synchronized. In such a case, correct correlative demodulation can not be performed unless the carrier wave is recovered and a baseband signal is demodulated. In this case, as in the first embodiment, by masking the output from a correlator with a carrier wave recovery signal, it is possible to recognize a start point of information transmission correctly.

<Third Embodiment>

Figure 9:
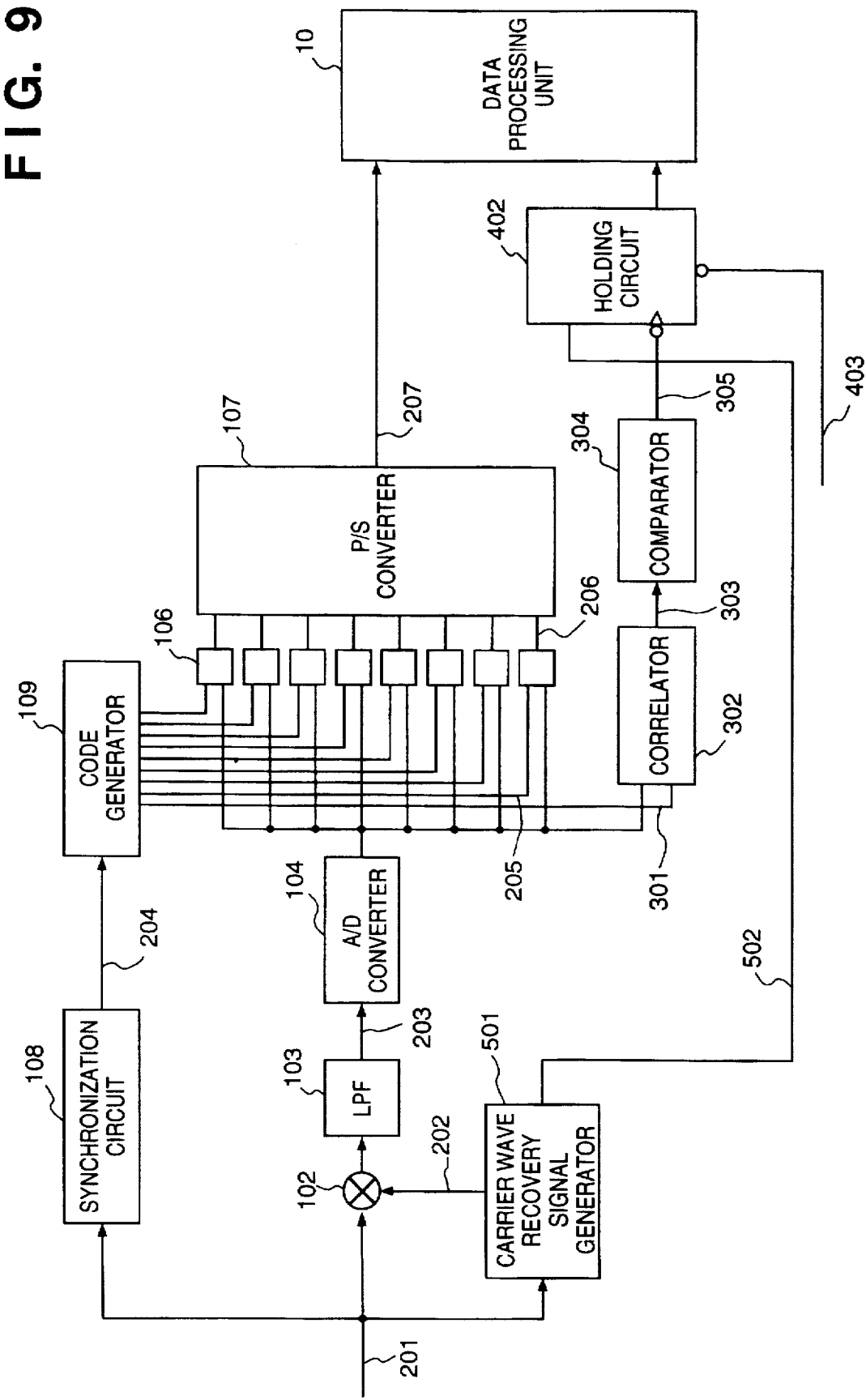
FIG. 9 is a block diagram illustrating a configuration of a receiver according to a third embodiment.

FIG. 9 is a block diagram illustrating a configuration of a receiver according to a third embodiment of the present invention. The same units and elements as those in FIG. 7 are referred by the same reference numerals and explanations of those are omitted. In FIG. 9, reference numeral 501 denotes a carrier wave recovery signal generator having a function to generates a carrier wave recovery signal 502 when carrier wave is recovered.

Figure 10:
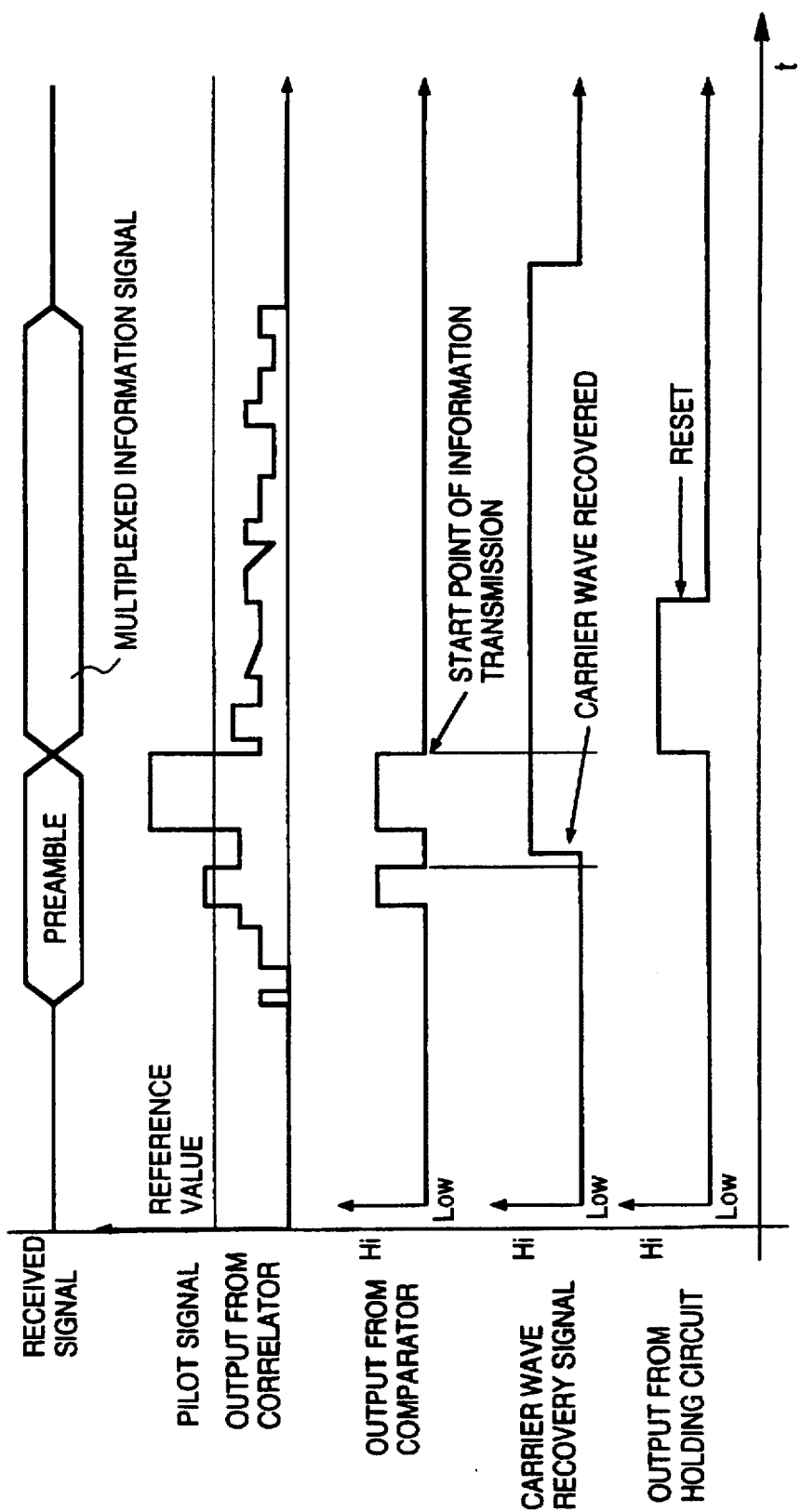
FIG. 10 is a timing chart according to the third embodiment.

In the third embodiment, the code synchronization signal 401 in the second embodiment is replaced by the carrier wave recovery signal 502. It is apparent that a correct start point of an information signal can be recognized at a timing represented by a timing chart shown in FIG. 10.

Further, regarding a system which uses a pilot signal as a spread code of information transmission, the example shown in FIG. 4 can be applied.

Furthermore, in the third embodiment, digital correlative demodulation is performed as an example. However, the third embodiment can be applied when an analog demodulator is used instead of a digital demodulator.

According to the third embodiment as described above, a changing point from a preamble period to a information transmission period and an end point of information transmission can be determined at a lower level of a communication system. Accordingly, it is unnecessary to insert a unique word in a data stream, thereby improving information transmission efficiency. Especially, this is extremely effective for a packet mode data transmission.

In addition, if an output from a pilot signal correlator is unstable before a received signal and a spread code are synchronized or a carrier wave is recovered, it is possible to recognize a correct start point of information transmission, and to obtain the same effect as in the first embodiment.

<Fourth Embodiment>

Next, a fourth embodiment of the present invention will be described. The fourth embodiment describes a case where one of the codes used for demodulation is used as a pilot code, and where a function of a correlator for demodulation and a function of a pilot signal correlator are realized by a single unit.

Figure 13:
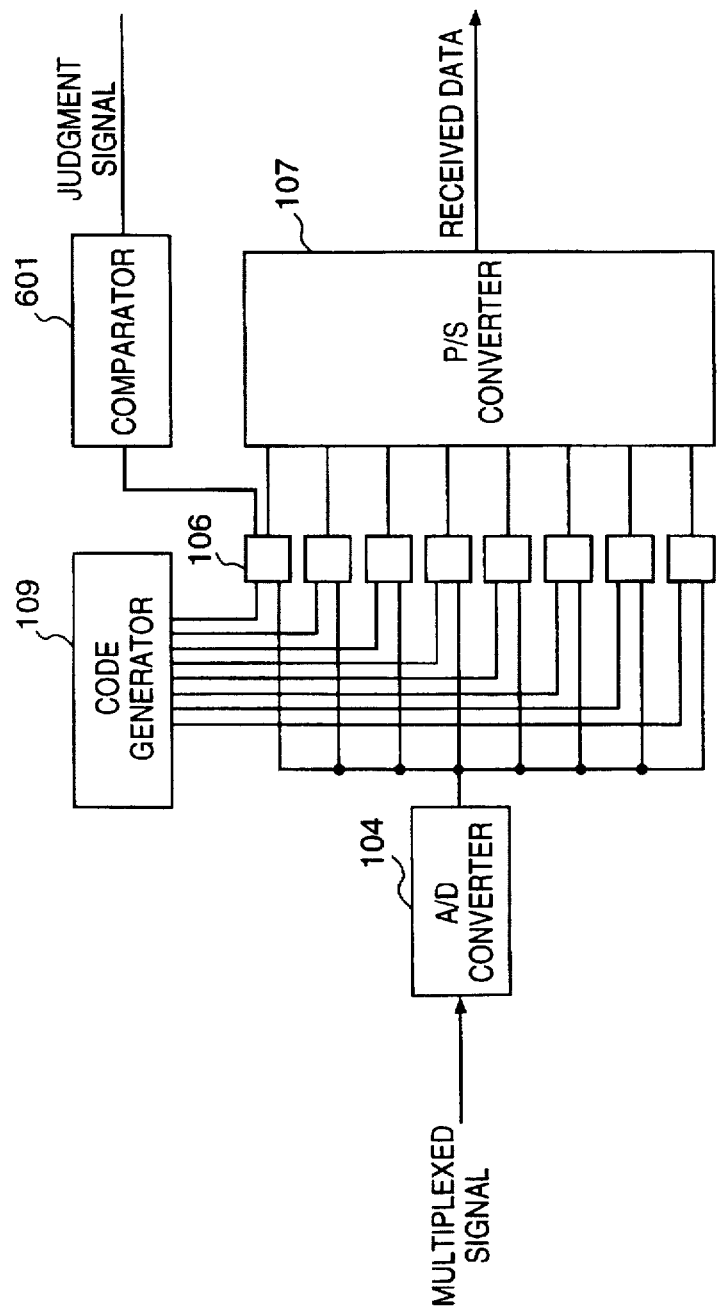
FIG. 13 is a diagram showing a configuration of a receiver according to a fourth embodiment.

FIG. 13 is a block diagram showing a configuration according to the fourth embodiment.

In FIG. 13, the AD converter 104 is for converting a baseband multiplexed signal into digital data, and the correlators 106 are digital correlators for performing correlative demodulation of each information channel. Further, a comparator 601 is connected to an output of one of correlators 106, and compares the output from the correlator 106 with a reference value.

The fourth embodiment shows an example in which a code division multiplexed baseband signal is converted into digital data, then the digital data is applied with correlative demodulation in the digital correlators. When an output signal from a correlator is expressed with eight-bit binary notation with plus or minus sign, then the range of the output signal from the correlator is between −128 and 127. Further, by referring the sign bit of the output signal from the correlator, it is possible to demodulate a modulated data symbol of a corresponding information channel.

Meanwhile, if there is no signal which is spectrum-spread with a spread code which is assigned to the channel in a received signal while waiting for transmitted data and receiving a preamble signal, namely if there is not enough electrical power of a received signal on the information channel, then an output from the corresponding correlator is near 0.

Accordingly, by providing the comparator 601 for comparing an output from a correlator with a predetermined threshold as shown in FIG. 13, it is possible to judge whether or not there is modulated data on an information channel or not, in other words, whether or not an information signal is received. It should be noted that the comparator is not for judging a received data symbol, but for judging electrical power of a received signal.

Figure 14:
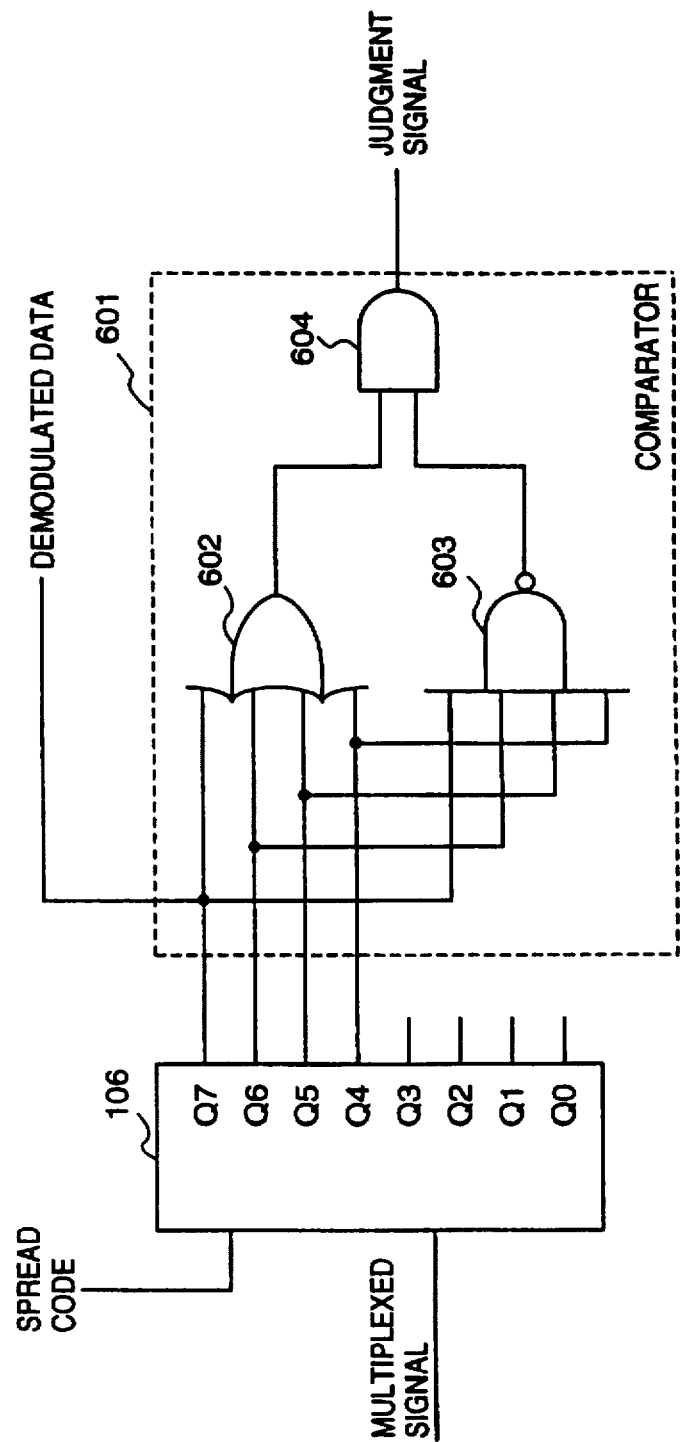
FIG. 14 is a diagram showing an example of a configuration of comparator according to embodiments.

FIG. 14 is a diagram showing an example of a configuration of a comparator 601, and FIG. 15 is a table used to determine reception of transmission.

Note, it is assumed that the receiver is not receiving any information signal if an output from the correlator 106 is in a range between −16 to 15.

Further, as shown in FIG. 15, if an output from the correlator 106 is equal or greater than 16 or equal or less than −17, both outputs from a multi-input OR gate 602 and a multi-input NAND gate 603 become high level. Therefore, an output from a two-input AND gate 604, as a judgment signal, becomes a high level, and it is possible to recognize that electric power of a received signal is over a predetermined level, thus correct information data can be received.

Whereas, if an output from the correlator 106 is equal or greater than −16 and equal or less than 15, then either an output from the multi-input OR gate 602 or an output from the multi-input NAND gate 603 becomes a low level. Accordingly, an output from the two-input AND gate 604, as the judgment signal, becomes a low level, which indicates that electric power of a received signal is lower than a predetermined level, thus, it is possible to recognize that demodulated data is incorrect.

In accordance with the operation of the comparator 601 as described above, by detecting a leading edge of a control signal (judgment signal), it is possible to determine the start point of information data in a data stream.

<Fifth Embodiment>

Figure 16:
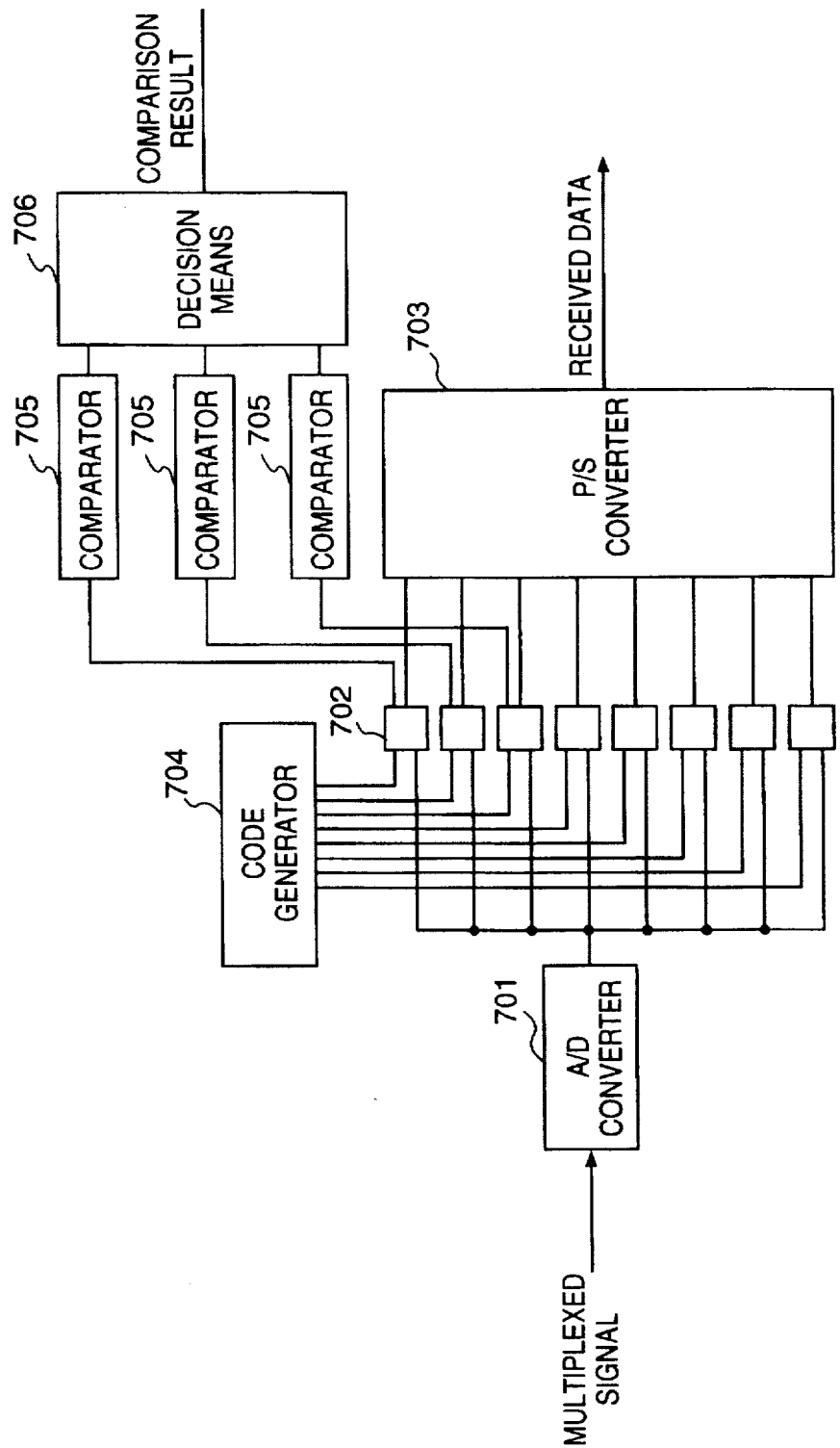
FIG. 16 is a block diagram according to a fifth embodiment.

FIG. 16 is a block diagram according to a fifth embodiment.

Referring to FIG. 16, an analog digital converter 701 converts a baseband multiplexed signal into digital data, and correlators 702 are digital correlators for performing correlative demodulation of each information channel. Further, comparators 705 are connected to outputs from three correlators 702, and compare each output from each correlator 702 with a reference value. Furthermore, a decision means 706 is connected to the outputs of the comparators 705, and determines a comparison result by majority in accordance with the output values from the comparators 705.

Generally in a wireless communication system, an output from a correlator has a certain deviation with respect to a theoretical value because of deterioration of communication path characteristics, noises, or non-linearity of transmission system, and so on. Especially, if characteristics of a communication path are poor, there is a fear that a correct judgment can not be performed by a single comparator 705, differing from the above embodiments.

In the fourth embodiment, therefore, a plurality of comparators each of which is identical to the comparator described in the above embodiment are provided for the three correlators, and each comparator compares an output from one correlator to a reference value. If the transmission path is in ideal state, the three comparators 705 perform the similar operations as in the above embodiment when waiting for a transmitted signal, receiving a preamble signal, and receiving an information signal, and generates a judgment signal. Therefore, even though some of a plurality of judgment signals indicating reception of information signals are unstable because of a state of the transmission path and so on, as described above, by deciding an output from the decision circuit 706 by majority on the basis of the three outputs from the comparators and by using the output as a judgment signal for judging reception of a information signal, it is possible to prevent misjudgment by the decision circuit 706. Accordingly, as in the aforesaid embodiments, a reception of an information signal can be recognized correctly.

It should be noted that a method of obtaining a comparison result from the outputs from a plurality of comparators 705 is not limited to the simple decision by majority as described above, and can be determined by referring a comparison result obtained by comparing an output from a correlator with a different reference value, for example.

Further, in the aforesaid embodiment, a digital correlative demodulation is described as an example, however, the present invention is not limited to this. For example, it is possible to realize the same effect of the present invention, when an analog demodulator is used, by using a comparator for performing the equivalent operation to that of the above embodiments.

It should be noted that when characteristics of transmission path are not poor, one comparator is enough. Further, if a correlator for synchronization is included in a synchronization circuit 108, it is possible to recognize a preamble signal and a postamble signal on the basis of a correlation output from the correlator for synchronization.

According to the embodiment as described above, since it is possible to judge whether a receiving signal is an information signal or not in a code division multiple communication method, the SFD (Start Frame Delimiter) in a data stream becomes unnecessary, thus improving the information transmission efficiency. Especially, this is extremely effective for a packet mode data transmission.

Further, according to the fifth embodiment, in a case where there is a fear that a judgment signal cannot be obtained because of poor characteristics of transmission path and effects of noises, by referring outputs of a plurality of correlators, it is possible to prevent misjudgment by a decision circuit, thereby obtaining the same effect as described in the embodiments.

<Other Embodiment>

The present invention can be applied to a system constituted by a plurality of devices or to an apparatus comprising a single device.

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS or the like working on the computer performs a part or entire processes in accordance with designations of the program codes and realizes functions according to the above embodiments.

Furthermore, the present invention also includes a case where, after the program codes read from the storage medium are written in a function extension board which is inserted into the computer or in a memory provided in a function extension unit which is connected to the computer, CPU or the like contained in the function extension board or unit performs a part or entire process in accordance with designations of the program codes and realizes functions of the above embodiments.

The present invention is not limited to the above embodiments and various changes and modifications can be made within the spirit and scope of the present invention. Therefore to appraise the public of the scope of the present invention, the following claims are made.

What is claimed is:

1. A spread spectrum communication method comprising the steps of:

correlating a received signal with a spread code;

comparing a correlative output, obtained in said correlating step, to a reference value; and recognizing a start point of information transmission in a case where the correlative output becomes lower than the reference value, after being higher than the reference value on the basis of a comparison result obtained at said comparing step.

2. A spread spectrum communication method according claim 1, further comprising a receiving step of receiving a multiplexed information signal using a plurality of different pseudo-random sequences as spread codes.

3. A spread spectrum communication method according to claim 2, wherein a preamble signal is received as a pilot signal, and a trailing edge of the pilot signal is recognized as the start point of transmission of the multiplexed information signal.

4. A spread spectrum communication method comprising the steps of:

correlating a received signal with a spread code;

comparing a correlative output, obtained in said correlating step, to a reference value; and recognizing an end point of information transmission in a case where the correlative output becomes more than the reference value, after being lower than the reference value, on the basis of a comparison result obtained at said comparing step.

5. A spread spectrum communication method according to claim 4, further comprising a receiving step of receiving a multiplexed information signal using a plurality of different pseudo-random sequences as spread codes.

6. A spread spectrum communication method according to claim 5, wherein a postamble signal is received as a pilot signal, and a leading edge of the pilot signal is recognized as the end point of transmission of the multiplexed information signal.

7. A spread spectrum communication apparatus comprising:

correlating means for generating a correlative output corresponding to a correlation between a received signal and a spread code;

comparing means for comparing the correlative output to a reference value; and recognition means for recognizing a start point of information transmission in a case where the correlative output becomes lower than the reference value, after being higher than the reference value, on the basis of a comparison result by said comparing means.

8. The spread spectrum communication apparatus according to claim 7, further comprising receiving means for receiving a multiplexed information signal using a plurality of different pseudo-random sequences as spread codes.

9. The spread spectrum communication apparatus according to claim 8, wherein a preamble signal is received as a pilot signal, and a trailing edge of the pilot signal is recognized as the start point of transmission of the multiplexed information signal.

10. The spread spectrum apparatus according to claim 7, wherein the spread code is identical to a spread code of a pilot signal.

11. The spread spectrum communication apparatus according to claim 7, wherein the spread code is identical to one of a plurality of spread codes used to multiplex a plurality of information channels.

12. The spread spectrum communication apparatus according to claim 7, further comprising generating means for generating a synchronization signal when a received signal and a code are synchronized, and latching means for latching the synchronization signal in accordance with the comparison result by said comparing means.

13. The spread spectrum apparatus according to claim 7, further comprising generating means for generating a carrier recovery establishment signal when a carrier wave of a received signal is recovered, and latching means for latching the carrier wave recovery establishment signal in accordance with the comparison result of said comparing means.

14. The spread spectrum communication apparatus according to claim 7, further comprising a plurality of comparing means, and the comparison result is decided on the basis of outputs from the plurality of comparing means.

15. A spread spectrum communication apparatus comprising:

correlating means for generating a correlative output corresponding to a correlation between a received signal and a spread code;

comparing means for comparing the correlative output to a reference value; and recognition means for recognizing an end point of information transmission in a case where the correlative output becomes more than the reference value, after being lower than the reference values, on the basis of a comparison result by said comparing means.

16. The spread spectrum apparatus according to claim 15, further comprising receiving means for receiving a multiplexed information signal using a plurality of different pseudo-random sequences as spread codes.

17. The spread spectrum apparatus according to claim 16, wherein a postamble signal is received as a pilot signal, and a leading edge of the pilot signal is recognized as the end point of transmission of the multiplexed information signal.

18. The spread spectrum apparatus according to claim 15, wherein the spread code is identical to a spread code of a pilot signal.

19. The spread spectrum apparatus according to claim 15, wherein the spread code is identical to one of a plurality of spread codes used to multiplex a plurality of information channels.

20. The spread spectrum apparatus according to claim 15, further comprising a plurality of comparing means, and the comparison result is decided on the basis of outputs from the plurality of comparing means.

21. A spread spectrum communication apparatus comprising:

correlative demodulation means for performing correlative demodulation on a received signal by using a single spread code;

comparing means for comparing a correlative output from said correlative demodulation means to a reference value;

recognition means for recognizing either a start point or an end point of information transmission on the basis of a comparison result by said comparing means;

generating means for generating a synchronization signal when a received signal and a code are synchronized; and latching means for latching the synchronization signal in accordance with the comparison result by said comparing means.

22. A spread spectrum communication apparatus comprising:

correlative demodulation means for performing correlative demodulation on a received signal by using a single spread code;

comparing means for comparing a correlative output from said correlative demodulation means to a reference value;

recognition means for recognizing either a start point or an end point of information transmission on the basis of a comparison result by said comparing means;

generating means for generating a carrier wave recovery establishment signal when a carrier wave of a received signal is recovered; and latching means for latching the carrier wave recovery establishment signal in accordance with the comparison result by said comparing means.

* * * * *

UNITED STATES PATENT AND TRADEMARK OFFICE
CERTIFICATE OF CORRECTION

PATENT NO. : 5,768,305

DATED    : June 16, 1998

INVENTOR(S) : Tetsuo Kanda

It is certified that error appears in the above-identified patent and that said Letters Patent is hereby corrected as shown below:

Title page, item [56] insert the following:

U.S. PATENT DOCUMENTS

Insert the following:

| | | | |
|---|---|---|---|
| 5,151,920 | 9/1992  | Haagh et al.     | 375/200 |
| 5,239,557 | 8/1993  | Dent             | 370/342 |
| 5,274,665 | 12/1993 | Schilling        | 375/200 |
| 5,309,474 | 5/1994  | Gilhousen et al. | 370/342 |
| 5,495,509 | 2/1996  | Lundquist et al. | 375/367 |
| 5,555,268 | 9/1996  | Fattouche et al. | 375/206 |
| 5,598,429 | 1/1997  | Marshall         | 375/210 |

COLUMN 5

Line 7, "However" should read --However,--;
Line 12, "period" should read --period.--; and
Line 32, "bit" should read --bits--.

COLUMN 6

Line 31, "a information" should read --an information--;
Line 33, "an received" should read --a received--;
Line 35, "can not" should read --cannot--;
Line 48, "generates" should read --generate--; and
Line 63, "a information" should read --an information--.

UNITED STATES PATENT AND TRADEMARK OFFICE
CERTIFICATE OF CORRECTION

PATENT NO. : 5,768,305

DATED : June 16, 1998

INVENTOR(S) : Tetsuo Kanda

It is certified that error appears in the above-identified patent and that said Letters Patent is hereby corrected as shown below:

COLUMN 7

Line 17, "AD" should read --A/D--; and

COLUMN 8

Line 27, "can not" should read --cannot--;
    Line 37, "generates" should read --generate--; and
    Line 44, "a information" should read --an information--.

COLUMN 9

Line 14, "Embodiment>" should read --Embodiments>--; and
    Line 62, "value" should read --value,--.

COLUMN 11

Line 13, "values," should read --value,--.

Signed and Sealed this

Thirteenth Day of April, 1999

Q. TODD DICKINSON

*Attest:*

*Attesting Officer*    *Acting Commissioner of Patents and Trademarks*